United States Patent [19]

Chatelet et al.

[11] 4,372,928

[45] Feb. 8, 1983

[54] METHOD OF SEPARATING ISOTOPES FROM A GAS MIXTURE

[75] Inventors: Jean Chatelet, Rambouillet; Michel Clerc, Limours; Andre Coste, Paris; Paul Rigny, Sceaux, all of France

[73] Assignee: Commissariat a l'Energie Atomique, Paris, France

[21] Appl. No.: 103,934

[22] Filed: Dec. 20, 1979

Related U.S. Application Data

[63] Continuation of Ser. No. 828,616, Aug. 23, 1977, abandoned.

[30] Foreign Application Priority Data

Sep. 24, 1976 [FR] France ............................ 76 28725

[51] Int. Cl.$^3$ ............................................ B01D 59/00
[52] U.S. Cl. ...................................... 423/249; 55/72; 204/157.1 R; 250/423 P; 423/3
[58] Field of Search ....................... 250/423 P; 55/72; 423/3, 249; 204/157.1 R

[56] References Cited

U.S. PATENT DOCUMENTS 4,000,420 12/1976 Harris ................................ 423/249

Primary Examiner—Deborah L. Kyle
Attorney, Agent, or Firm—Kerkam, Stowell, Kondracki & Clarke

[57] ABSTRACT

The invention relates to a method of separating isotopes from a gas mixture, of once ionized uranium the isotopes being separated by the combined effect of photon irradiation by laser light followed by Penning ionization of ions selectively excited by the laser light.

According to the invention a gas of once ionized uranium isotopes is irradiated with laser light made up of photons having an energy which resonates with an excitation level of an isotope of the gas mixture. Metastable atoms or molecules are simultaneously introduced into the mixture and have an excitation energy which is less than the energy for a further ionization of the constituents of the mixture and greater than the energy gap between the energy for a further ionization of the isotope excited by the laser light and the energy of the excitation level of the same isotope.

5 Claims, 4 Drawing Figures

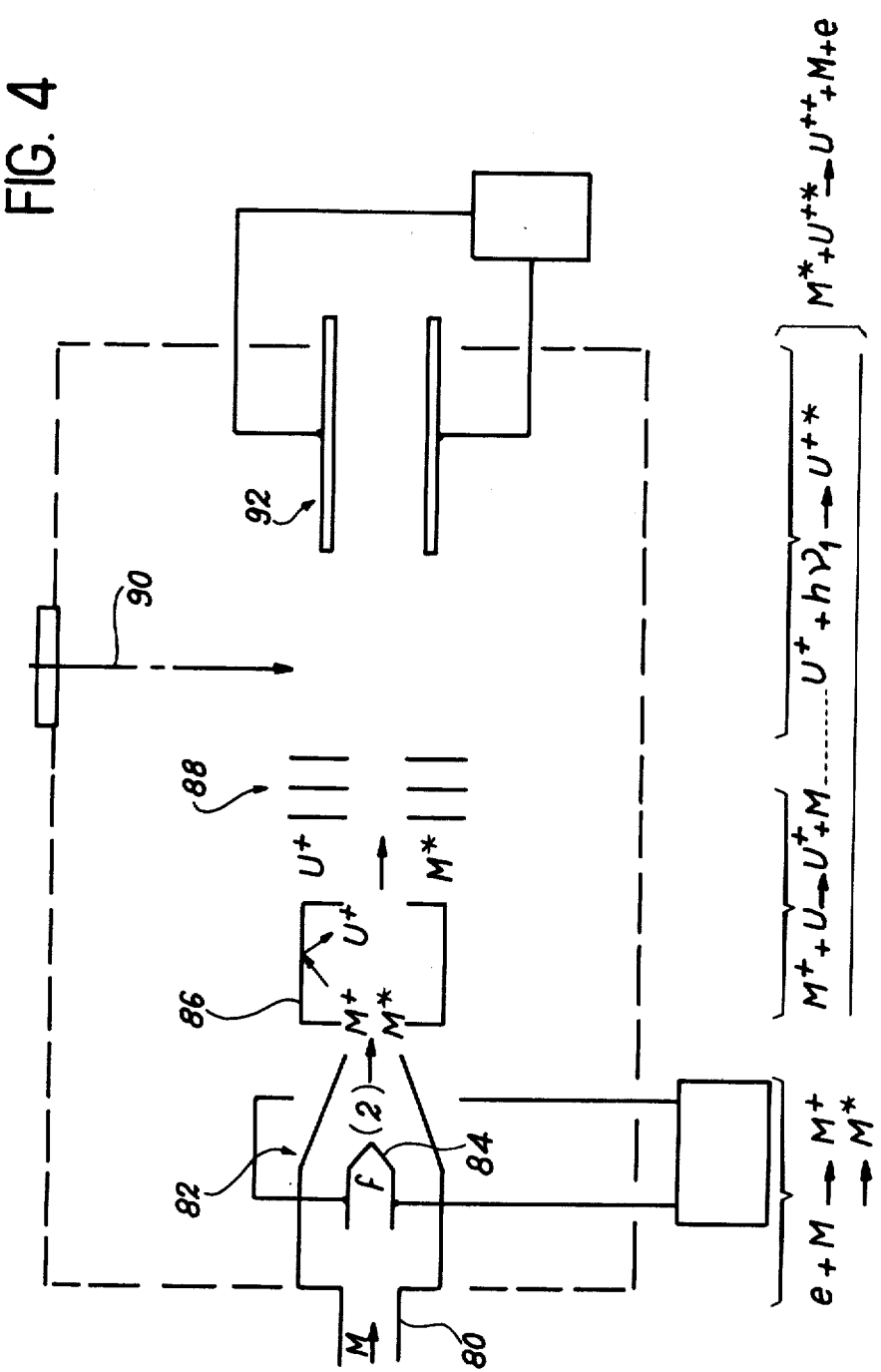

METHOD OF SEPARATING ISOTOPES FROM A GAS MIXTURE

This is a continuation of application Ser. No. 828,616, filed Aug. 23, 1977, and now abandoned.

The invention relates to a method of separating isotopes of once ionized uranium from a gas mixture, the once ionized isotopes being separated by the combined effect of photon irradiation by laser light followed by Penning ionization of the once ionized uranium ions selectively excited by the laser light.

As is known, a preferred prior art method of separating the different isotopes of uranium ($U^{235}$ and $U^{238}$) consists in introducing a laser light beam into a gas mixture containing uranium in pure or combined form, the energy of the laser photons resonating with a characteristic transition of an isotope. If the excitation is to be selective, it is essential that the energy width of the transmitted laser radiation be less than the gap between the excitation levels of the uranium isotopes, the gap being due to the difference between their masses. This method is practicable for selective photo-excitation or even photo-dissociation of a given uranium isotope, but the low effective cross-sections of excitation by laser light for photo-ionizing compounds greatly reduce the total efficiency of the operation and increase its cost, sometimes in prohibitive manner.

In the prior art methods, the first step usually consists in selectively exciting the desired atomic isotope, e.g. the uranium atom obtained from metal vapour, using a suitable dye laser having a spectral width less than the isotopic displacement of the absorption line of the uranium atom. The effective cross-section of this reaction is of the order of $10^{-14}$ cm$^2$. In a subsequent step, using the same laser or a higher-capacity laser, the desired isotope is brought to the ionization potential by successive electron or vibrational transitions.

Only the first excitation has to be truly selective. If operation is such that only one excitation level is sufficiently populated and corresponds to a given isotope, it is sufficient, starting from this level of electron or vibrational excitation, to ionize the resulting selectively excited atoms by any suitable means, the latter excitation not being selective. The reason is that the adjacent levels corresponding to the other isotopes are not populated, since the excitation by the first laser light is selective and populates only the excitation levels of one isotope.

The invention substantially consists in replacing the photo-ionization process, i.e. the second non-selective photo-ionization step, by Penning ionization having a much greater effective cross-section (1000 to 10,000 times as great as the effective photo-ionization cross-section using laser light), the isotopes being uranium isotopic; once ionized.

The term "Penning ionization" means ionization of the excited gas isotope, once ionized by collision with a metastable atom or molecule. At the power level required for photo-ionization, the production of the aforementioned excited metastable atoms is more economic than the production of ultra-violet or even infra-red photons used in the prior art.

According to the invention there is provided a method of separating isotopes from a gas mixture containing a number of isotopes of once ionized uranium in which the mixture of once ionized uranium is irradiated with laser light of photons having an energy which resonates with an excitation level of a given isotope of the gas mixture. Simultaneously there is introduced metastable atoms or molecules into the mixture with the metastable atoms or molecules having an excitation energy which is less than the energy for a further ionization of the constituents of the mixture and greater than the energy gap between the energy for a further ionization of the given isotope excited by the laser light and the energy of the excitation level of the same isotope. Preparation of the given isotope results from the further ionization of the excited isotope by the metastable atoms or molecules and this further ionization is a Penning ionization.

As previously stated, the excitation energy of the metastable atoms or molecules is made less than the ionization further energy of the isotopes of the same mixture, to ensure that a collision between a metastable atom and a constituent of the mixture not corresponding to the isotope excited by the photons does not non-selectively ionize the other isotopes of the mixture, which would result in a loss of metastable atoms. If excitation is to occur, however, the energy of the metastable atoms liberated by collision must be greater than the energy gap between the further ionization energy and the energy of the excitation level obtained by laser irradiation.

Of course, as in the prior art, the width of the spectral line of the laser light must be less, as regards energy, than the energy gap between two excitation levels of the uranium isotopes.

In the invention, once-ionized uranium ($U^+$) is used instead of metallic uranium in the gas mixture, in which case the term "ionization energy" means the energy required for producing twice-ionized uranium ($U^{2+}$) from once-ionized uranium.

Other features and advantages of the invention will be clear from the following description of embodiments given by way of example with reference to the accompanying drawings, in which:

FIG. 4 shows a variant embodiment.

Figure 1:
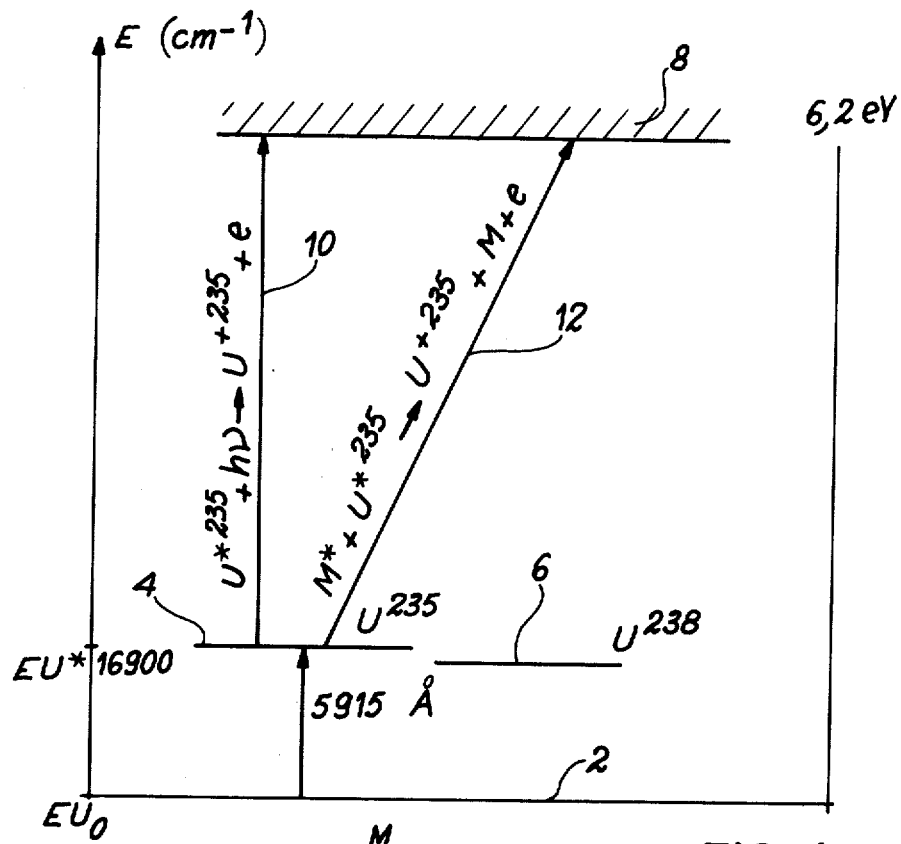
FIG. 1 is an energy diagram illustrating the energy levels corresponding to the ionization of a uranium atom known in the prior art.

In FIG. 1, reference 2 denotes the fundamental level of the uranium atom in vapour form, references 4 and 6 denote the energy levels of atoms of uranium 235 and 238 excited to a first level, and the shaded region 8 denotes the ionization continuum corresponding to an energy of 6.2 electron volts with respect to the fundamental state. The difference between levels 4 and 6 represents the isotopic displacement of these excitation levels of the uranium atom; this transition occurs at 5915 Å in the case of uranium 235. Consequently, the fineness of the line of light emitted by the laser must be less than the energy gap between the uranium 235 line and the uranium 238 line; this is easy to achieve. Arrow 10 shows the subsequent step of photo-ionization in the prior art, which is performed in accordance with the reaction:

$$U^{*235} + h\nu \rightarrow U^{+235} + e,$$

and arrow 12 shows another reaction according to the prior art:

$$M^* + U^{*235} \rightarrow U^{+235} + M + e,$$

for ionizing uranium, starting from the sufficiently populated excitation level of uranium 235. M* is a metastable atom or molecule.

Only the first reaction:

$$U^{238} + U^{235} + h\nu \rightarrow U^{238} + U^{*235}$$

is selective. The second (symbolised by arrow 10 or 12) need not necessarily be so.

By way of example, in which the first step is the isotopically selective transition of uranium 235 at 5915 Å, use may advantageously be made of metastable atoms of mercury Hg ($^3P_1$), the substance M is advantageously an atomic metal state which is substantially inert towards uranium vapour. A metastable state of a rare gas or mercury, chosen from Table 1, can be used provided that it meets the energy criteria set out previously, or use can be made of an excited dimer or exminer (hexamer) such as $HE^*_2$ or $Ar^*_2$ obtained by combination between a metastable state and a fundamental state. Examples of suitable metastable states of rare gases are the states $^3P_0$ and $^3P_2$ of Ar, Xe and Kr, which are metastable as a result of the violoation of the spectroscopic selection rule $\Delta J = 1$. The states $^1P_1$ and $^3P_1$ are not truly metastable, since transition to the fundamental state $S_0$ is permitted; however, their real lifetime is very long as a result of trapping of fluoresence on to auto-absorption of the resonance line towards the fundamental state $S_0$. Helium, which has a different electron structure, obeys the rule $\Delta S = 0$.

Finally, ionization by the metastable state (Penning ionization) of mercury produced by absorption of the line at 2357 Å is a catalytic procedure well known in photochemistry.

As shown on FIG. 1, and in U.S. Pat. No. 4,000,420 the energy delivered by the metastable atom must be less than 6.2 electron volts so that it does not non-selectively ionize the uranium atoms from the fundamental state and is not greater than the energy gap (approximately 4.1 electron volts) between the excitation level of uranium (U*235) and the ionization level. The diagram in FIG. 1 relates to once-ionized uranium. In the invention, once-ionized uranium is the starting material and the final product is twice-ionized uranium after selected excitation of U+ and Penning ionization.

Figure 2:
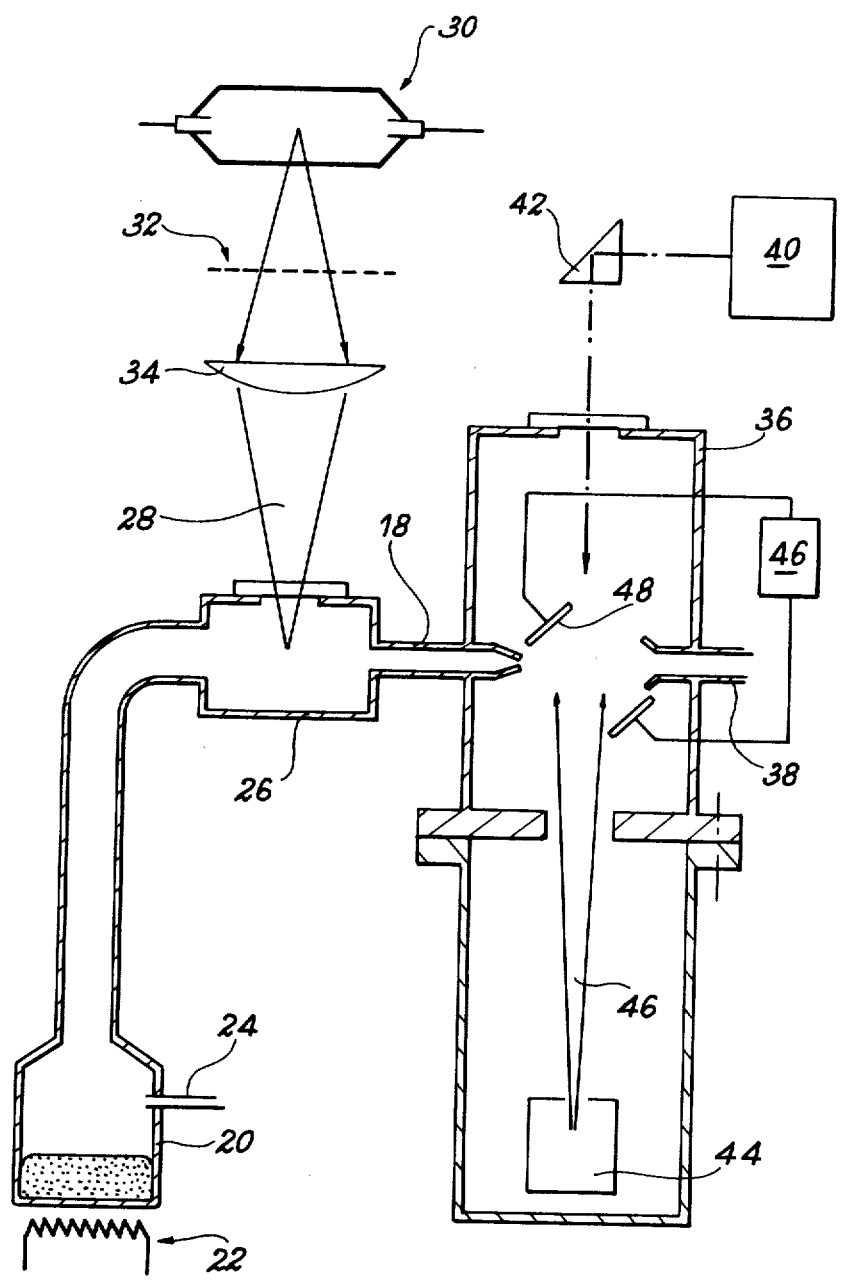
FIG. 2 shows an embodiment of a device for working a method according to the prior art, wherein the metastable atom is mercury conveyed by pumping and the uranium source is metallic uranium vaporized by heating.

In the example with reference to FIG. 2, the first step is the selective isotopic transition of uranium at 5915 Å and ionization by metastable atoms of mercury Hg $^3P_1$) in accordance with the reactions:

$$U_0^{235} + h\nu(16900 \text{ cm}^{-1}) \rightarrow U^{*235} \quad (1)$$

$$U^{*235} + Hg(^3P_1) \rightarrow U^+ + Hg(^1S) + e \quad (2)$$

The excess energy liberated by Penning ionization is less than the energy of the first uranium transition, which avoids the formation of non-isotopically selected ions directly from the fundamental state $U_0$. The effective Penning ionization cross-sections are among the largest known ($10^{-14}$ to $10^{-16}$ cm$^2$).

In FIG. 2, reference 20 denotes a source of mercury heated by a resistor 22, the mercury being introduced through a tube 24. The mercury is conveyed in vapour form into a chamber 26 where it is converted into gaseous metastable mercury and discharged through a tube 18. The metastable state Hg($^3P_1$) of mercury is obtained by excitation of the mercury in chamber 26 by a beam of light 28 emitted by a mercury lamp 30 through a filter 32 and a lens 34. The light focused at 2537 Å excites the mercury, which is introduced at a suitable flow rate into chamber 36. Unused mercury is discharged through a pipe system 38 associated with pumping means (not shown). A Rhodamime 6G laser 40 transmits a beam at 5915 Å through a total-reflection prism 42 into chamber 36, which contains both the jet of metastable mercury atoms and the jet of atomic uranium produced by a chamber 44 heated to approximately 2,000° C., from which the jet of uranium 46 escapes.

By means of this device, the uranium atoms are selectively ionized. The ionized uranium can be collected on plates 48 connected to a suitable power supply 46, or can be extracted by electrodes and a pumping system (not shown) suitably disposed in the chamber.

The second mercury resnonace line at 1850 Å is filtered, to avoid forming a high excitation state of mercury, which might produce non-selective ionization or excitation of uranium by collisions.

Figure 3:
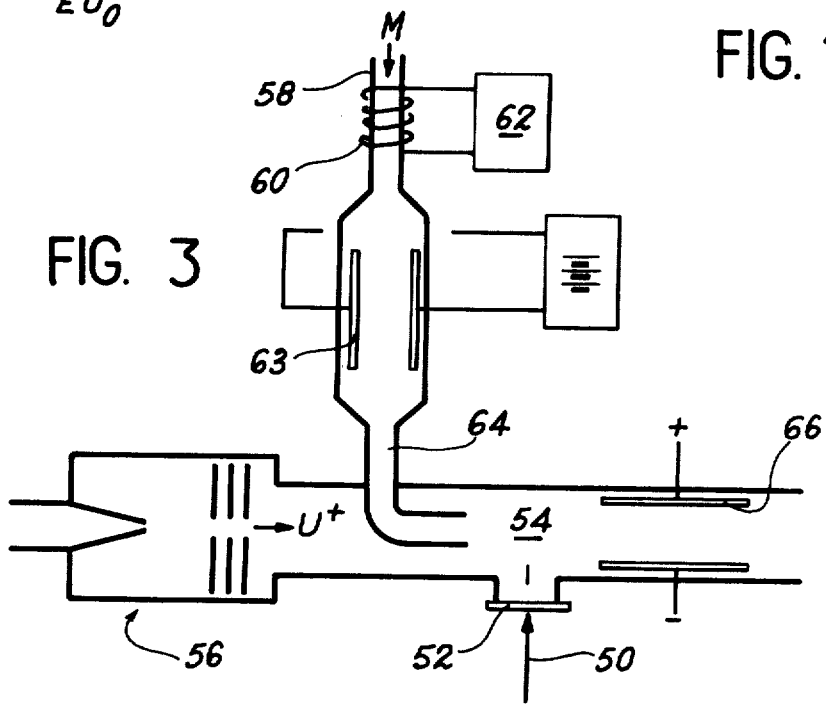
FIG. 3 shows an embodiment of a device for working the method according to the invention, where the starting material is uranium which has already been once ionized.

FIG. 3 shows an embodiment of a device for working the method of the invention, in which laser light conveyed along arrow 50 through a window 52 irradiates a mixture of uranium in the form of ions and metastable atoms at 54. The source of ions, which has any suitable conventional structure, is shown at 56. The metastable atoms are produced after introducing substance M into pipe system 58, where a high-frequency field is produced by a winding 60 supplied with very high-frequency current by a source 62. The M+ ions are separated from the M* metastable atoms by two electrodes 63, so that the metastable atoms M* are sent through a pipe system 64 to a chamber 54 where they react with once-ionized uranium to give twice-ionized uranium which can be collected e.g. on collecting plates such as 66. The potential of collecting plates 66 can be adjusted so that they collect only twice-ionized uranium ions and not once-ionized ions, which can be recycled to the ion source. The second uranium ionization potential is approximately 12 eV above the first.

To obviate the difficulty of producing metallic uranium vapour, it is advantageous to start from U+ ions and use a transition scheme similar to that explained with reference to FIG. 1, but this time giving the twice-ionized ion. The main advantage of a source of U+ ions is that the U+ ions can be confined and shaped in a beam, thus avoiding the problems of crucibles and neutral atomic beams. In addition, the kinetic energy of the ions can be controlled, which is difficult with neutral atomic beams. Furthermore, the gap between the first and second ionization potential leaves a wider choice in the energy of the metastable atoms of rare gases in Table 1. As can be seen, for example, the first stage of selective excitation of the $U^{235+}$ ion can be crossed by irradiation with a Rhodamine 6G laser supplying 206 eV and the second stage leads from this intermediate stage to the $U^{235++}$ ion by collision with the metastable krypton atom $^3P_1$ at 10.03 eV. Alternatively, the second harmonic of a Rhodamine B laser could be used for the first stage and the metastable xenon atom $^3P_1$ at 8.43 eV could be used for the second stage (of course these two examples are in no way limitative). Since the radiation life of metastable atoms is very long—of the order of a few hundredths of a second for the He ($2^3$s) and Ar($^3P_2$) levels, it is easy to produce them separately in an electric discharge or high-frequency field and introduce them, without excessive pumping speeds, into the ion beam, which has previously been excited to an isotopically selective state U$^{+*}$ by a laser. An example is given in FIG. 3, involving the two reactions:

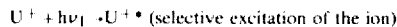

and

Since the ionization potential of the gases M in Table 1 is greater than 6.2 eV, there is no risk of a charge transfer reaction from U$^+$ of the kind

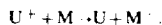

FIG. 4 shows another device for working the invention, also using Penning ionization and starting from once-ionized uranium, the device comprising a pipe system 80 connected to a source (not shown) of atoms of substance M in the gaseous state, conveying a beam of neutral substances into an ionization box 82, where electrons emitted by a hot cathode 84 (electrically energised by a supply 85) ionize or excite the atoms M. Box 82 is followed by an exchange box 86 and electrodes 88. Selective irradiation is produced by the light, which is sent along arrow 90. A pair of electrodes 92 can be placed at the end of the distance travelled. As shown in the drawing, the atoms M$^+$ and M$^*$ leave box 82 and enter box 86, the walls of which are at a negative potential to attract the M$^+$ ions, which exchange their charge on the uranium walls of box 26 (covered with metallic uranium) with uranium atoms, producing U$^+$. The metastable atoms on the other hand, continue travelling. U$^+$ and M atoms appear at the outlet of box 86 and, if they are subjected to suitable laser radiation, the selectively excited isotope in the form U$^+$ becomes doubly ionized by the previously-described reactions. The other isotope is doubly ionized by the laser energy, since the energy distribution is in accordance with the following inequalities:

E (ionization U$^+$ →U$^{++}$) < −E(U$^{+*}$) < E(M$^*$)

E (ionization U$^+$ →U$^{++}$)

The advantages of ionization by "Penning" collisions compared with photo-ionization, in the last step of a method of separating uranium isotopes by a laser, are as follows:

(1) The Penning ionization effective cross-section is very large ($10^{-14}$ to $10^{-16}$ cm$^2$).

(2) The metastable atoms, for which there is a wide choice of energy, can be produced in sufficient numbers ($10^{-10}$ to $10^{-2}$ cm$^{-3}$) with higher energy efficiency than ultra-violet photons of comparable energy;

(3) Owing to their very long life (of the order of $10^{-2}$s), metastable atoms can be conveyed at reasonable pumping speeds ($10^4$ cm s$^{-1}$).

(4) Metastable atoms can be produced "in situ" by absorption of the corresponding resonance lines indicated in Table 1.

Metastable atoms can directly transfer energies of 5 to 21 eV, which are inaccessible to lasers emitting at their fundamental frequencies, or are accessible with a very low yield by production of harmonics.

EXAMPLE

A d.c. laser was used, emitting a milliwatt at 5915 Å at a flow rate of $6\times10^{15}$ photons per second. It emitted light in an atmosphere of U$^+$ ions, the quantity being at least equal to that corresponding to a flow of U$^+$ ions greater than $10^{-3}$ amps. The ions can be produced by a Duoplasmatron or similar source. The flow rate of metastable atoms was likewise greater than 6.10$^{-15}$ per second. The metastables were produced either by a high-frequency discharge (2450 MHz, 100 W) at a gas flow rate of $10^4$ cm.s or by an electric current discharge of the order of 100 mA. As a result, $10^{10}$ to $10^{11}$ metastable atoms per cm$^3$ were produced at a flow rate of $10^4$ cm s$^{-1}$, thus giving a flow rate of $10^{14}$ to $10^{15}$ metastable atoms per cm$^{-2}$ s$^{-1}$.

The amount of thus-separated uranium was of the order of a microgram per hour.

TABLE 1

Example of metastable states. Energies in eV after BROCKLEHURST

| | METASTABLE STATES | | | IONS | | | |
|---|---|---|---|---|---|---|---|
| He | $2^3$S | $2^1$S | $2^1$P | | He | | |
| | 19,81 | 20,61 | 21,21 | | 24,58 | | eV |
| Ne | $^3P_2$ | $^3P_1$ | $^3P_0$ | $^1P_1$ | $^2P_{3/2}$ | $^2P_{\frac{1}{2}}$ | |
| | 16,61 | 16,67 | 16,71 | 16,84 | 21,56 | 21,66 | eV |
| Ar | $^3P_2$ | $^3P_1$ | $^3P_0$ | $^1P_1$ | $^2P_{3/2}$ | $^2P_{\frac{1}{2}}$ | |
| | 11,25 | 11,62 | 11,72 | 11,82 | 15,75 | 15,93 | eV |
| Kr | $^3P_2$ | $^3P_1$ | $^3P_0$ | $^1P_1$ | $^2P_{3/2}$ | $^2P_{\frac{1}{2}}$ | |
| | 9,91 | 10,03 | 10,56 | 10,64 | 14 | 14,66 | eV |
| Xe | $^3P_2$ | $^3P_1$ | $^3P_0$ | $^1P_1$ | $^2P_{3/2}$ | $^2P_{\frac{1}{2}}$ | |
| | 8,31 | 8,43 | 9,44 | 9,57 | 12,13 | 13,43 | eV |
| Hg | $^3P_1$ | $^3P_0$ | $^3P_2$ | | | | |
| | 4,86 | 4,66 | 6,67 | eV | | | |

Note:
The states $^3P_0$ and $^3P_2$ are metastable because of the rule $\Delta J = 1$. The states $^1P_1$ and $^3P_1$, which do not violate this rule, are not metastable but have a long life owing to radiation trapping.

Resonance lines $^3P_1$ { Ar 1067Å
        Kr 1236Å    $^1S_0$
        Xe 1470Å
$^3P_1$   Hg 2537Å

We claim:

1. A method of separating isotopes from a gas mixture containing a number of isotopes of once ionized uranium, comprising the step of irradiating the mixture of once ionized uranium ions, with laser light made up of photons having an energy which resonates with an excitation level of a given isotope of the gas mixture, introducing simultaneously metastable atoms or molecules into the same mixture, the metastable atoms or molecules having an excitation energy which is less than the energy for a further ionization of the constituents of the mixture and greater than the energy gap between the energy for a further ionization of the given isotope excited by the laser light and the energy of the excitation level of the same isotope, the separation of the given isotope resulting from the further ionization of the excited isotope by metastable atoms or molecules, this further ionization being a Penning ionization.

2. A method according to claim 1, wherein the metastable atoms are atoms selected from a group consisting of rare gases and mercury.

3. A method according to claim 1, wherein the metastable atoms are produced by electric discharge and subsequently pumped into the gas mixture.

4. A method according to claim 1, wherein the metastable atoms are produced by high-frequency discharge and subsequently pumped into the gas mixture.

5. A method according to claim 1, wherein the metastable atoms are produced by optical absorption.

* * * * *